United States Patent
Barnes

[11] Patent Number: 6,053,076
[45] Date of Patent: Apr. 25, 2000

[54] OFFSET HEAD RATCHET WRENCH

[76] Inventor: Benny R. Barnes, P.O. Box 415, Madison, Va. 22727

[21] Appl. No.: 09/250,302

[22] Filed: Feb. 16, 1999

Related U.S. Application Data

[60] Provisional application No. 60/076,723, Mar. 4, 1998.

[51] Int. Cl.[7] .............................. B25B 13/46; F16C 11/00; F16D 1/12
[52] U.S. Cl. .............................. 81/60; 81/177.8; 403/103; 403/324
[58] Field of Search .............................. 403/84–85, 100, 403/103, 104, 93–94, 97, 324, 325, 327; 81/177.7–177.9, 177.85, 60–63.2

[56] References Cited

U.S. PATENT DOCUMENTS

| | | |
|---|---|---|
| 1,265,535 | 5/1918 | Shannon . |
| 1,384,887 | 7/1921 | Burndahl . |
| 2,028,561 | 1/1936 | Pilger . |
| 2,707,413 | 5/1955 | Goodnow . |
| 2,889,160 | 6/1959 | Nelson ..................................... 403/93 |
| 4,406,186 | 9/1983 | Gummow . |
| 4,747,328 | 5/1988 | Howard . |
| 5,419,221 | 5/1995 | Cole . |
| 5,517,884 | 5/1996 | Sanders . |
| 5,570,617 | 11/1996 | Love . |
| 5,690,006 | 11/1997 | Pulliam . |
| 5,694,818 | 12/1997 | Nickipuck ......................... 81/177.8 X |

FOREIGN PATENT DOCUMENTS

| | | |
|---|---|---|
| 1212685 | 3/1960 | France . |
| 133869 | 6/1929 | Switzerland . |

*Primary Examiner*—D. S. Meislin
*Attorney, Agent, or Firm*—Richard C. Litman

[57] ABSTRACT

The invention is an improved ratchet wrench with a handle pivotally attached to a rotating head which can be locked into a position either axially aligned with the handle or laterally angled to one side of the handle. A locking mechanism includes a spring-biased, J-shaped structure, having an actuating shaft which passes through the handle and a locking pin which selectively engages one of a plurality of holes defined in a neck of the rotating head. The locking mechanism has a button on the actuating shaft to sandwich the spring against the handle and permit manual depression in order to move the locking pin from a locked to the unlocked position, the locking pin being biased by the spring towards the neck in a locked position. Angling the handle to one side allows the wrench to be used to loosen or tighten bolts where there is insufficient space to use a conventional straight wrench. The ratchet head may also be removed from the handle for use as a palm wrench or for substitution of the ratchet head with a ratchet head of a different size.

9 Claims, 4 Drawing Sheets

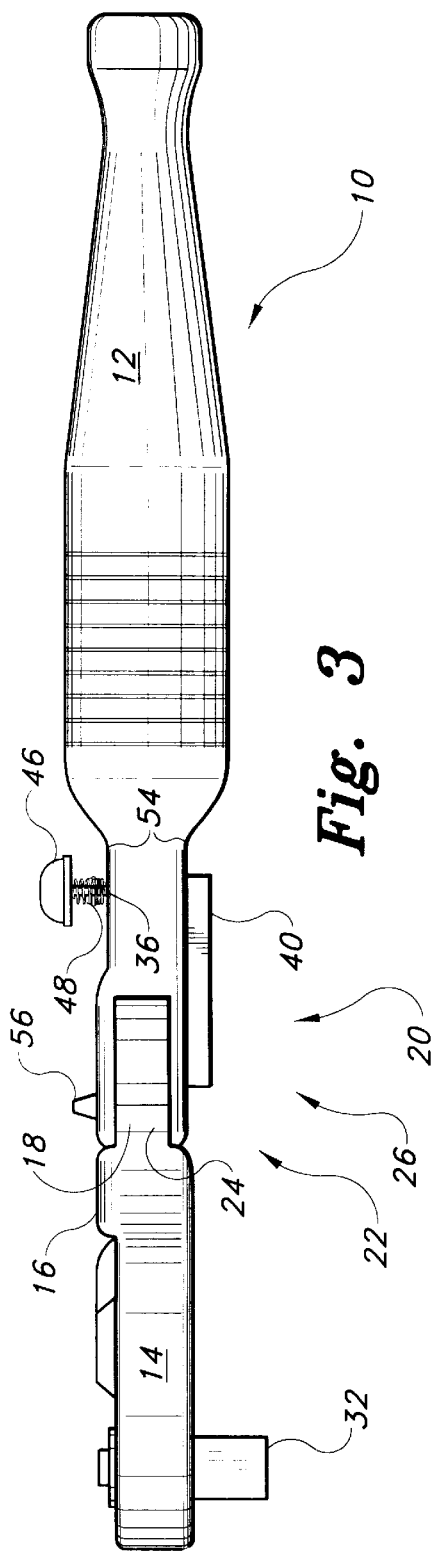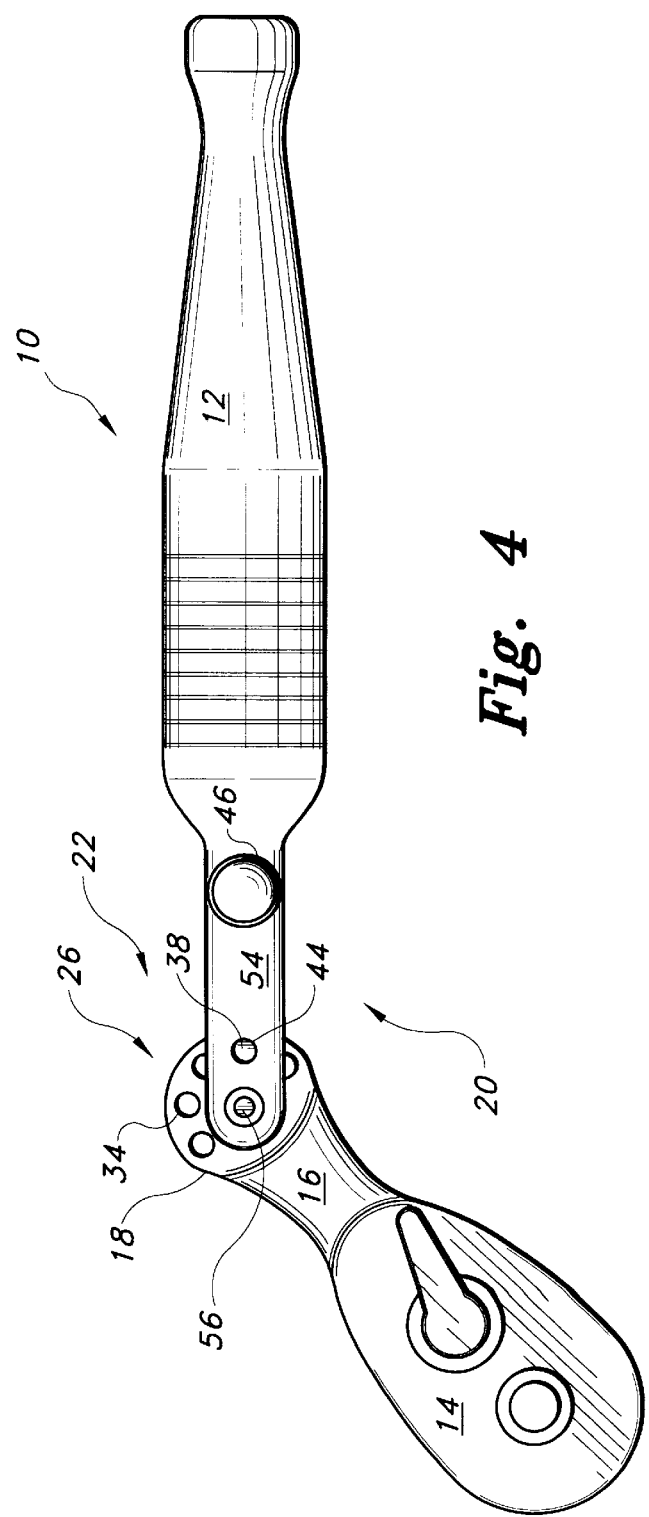

OFFSET HEAD RATCHET WRENCH

CROSS-REFERENCE TO RELATED APPLICATION

This application claims the benefit of U.S. Provisional patent application Ser. No. 60/076,723, filed Mar. 4, 1998.

BACKGROUND OF THE INVENTION

1. Field of the Invention

The present invention relates to a standard wrench or socket wrench with a head capable of rotating laterally with respect to the handle. The handle's rotation allows the wrench to tighten or loosen nuts in locations which are difficult or impossible to reach with a standard wrench.

2. Description of Related Art

Several other inventors have attempted to produce a satisfactory way to allow the head of a wrench to rotate laterally. For example, the invention of William Hetrick Shannon, U.S. Pat. No. 1,265,535, issued on May 7, 1918, uses a ratchet wheel to change the lateral angle of a wrench head. The ratchet is held in place by a handle pressed into a notch on the ratchet wheel by a leaf spring. The wrench is therefore not locked into position unless the handle is grabbed in such a way as to depress the lever.

John H. Burndahl disclosed in U.S. Pat. No. 1,384,887, issued on Jul. 10, 1921, a wrench whose head pivots on a notched wheel. The wheel is held in place by a sliding block, which is held in one of the notches by spring pressure. To rotate the wrench, the block is pushed rearward, the wrench repositioned, and the block released. The Burndahl invention suffers from the disadvantage that, as the notches in the wheel, the sliding block, and the spring experience wear, the notches will enlarge, the block will become smaller, and the spring will weaken. Because the spring tension and close fit between the block and the wheel notches hold the block in the locked position, it is possible that lateral pressure on the wrench could force the block back against the spring, unlocking the wrench. In contrast, the present invention has a locking pin which passes through the ratchet head and the handle on either side of the head; thus wear will only result in some play in the position of the head, not in the head coming unlocked.

U.S. Pat. No. 2,028,561, issued to Emil F. Pilger on Jan. 21, 1936, discloses a rotating-head wrench using a flat spring on the head to engage flutes on the handle to hold the wrench in position. The obvious result is that the spring will eventually weaken, destroying any ability of the head to lock into position.

Stephen A. Gummow disclosed in U.S. Pat. No. 4,406,186, issued on Sep. 27, 1983, a rotating-head socket wrench wherein the end surfaces of the head and handle abut during use, preventing the wrench from moving. To rotate the wrench to a different position, the head slides down the pivot joining the head and handle, taking the two out of contact with each other, and allowing the head to rotate. While this design is very strong, it only allows for three head positions, where the current invention provides for as many positions as there are possible holes drilled in the neck portion of the head ratchet head.

U.S. Pat. No. 4,747,328, issued to Leslie Howard on May 31, 1988, discloses a rotating-head socket wrench wherein the head pivots on a notched wheel, and is held in position by a rod extending through the handle. The rod is held in place by a pair of ball bearings pressed into indentations on the rod by springs. To rotate the head, the user grabs the portion of the rod which sticks out of the handle's end, pulls out, rotates the head, and pushes the rod back into position. As with U.S. Pat. No. 1,384,887 discussed above, wear of the notched wheel could eventually cause the locking rod to pop out of the notch.

James E. Cole disclosed in U.S. Pat. No. 5,419,221 an indexable head ratchet wrench wherein the connection pin between the handle and ratchet head extends through a splined orifice in the handle. The connection includes a slidable member which locks the ratchet head in position when pushed in one direction, and allows the ratchet head to pivot freely in the other position. With the ratchet head unlocked, a nut can be rapidly rotated by moving the handle back and forth.

The February, 1998, Snap-on *Hot Tools* catalog features a rotating head ratchet wrench that also functions as a speed wrench. The catalog refers to a "spline lock," but does not provide enabling disclosure. One of the tools pictured is stamped, "Patented USA," but no patent number is visible in the picture, and the text does not refer to the patent. Snap-on's product appears to be very similar to the aforementioned Cole patent.

Other patents relating to wrenches include U.S. Pat. No. 2,707,413, issued to Daniel M. Goodnow on May 3, 1955, describing an adjustable open head ratchet wrench; U.S. Pat. No. 5,517,884, issued to Alton W. Sanders on May 21, 1996, describing a speed wrench; U.S. Pat. No. 5,690,006, issued to Doyle H. Pulliam on Nov. 25, 1997, describing a slide-adjustable socket extender for socket wrenches; U.S. Pat. No. 5,570,617, issued to John A. Love on Nov. 5, 1996, describing an extendable extension handle for wrenches, ratchets, tire irons, and other hand tools; French Pat. No. 1,212,685, published on March 25, 1960; and Swiss Pat. No. 133,869, published on Jun. 30, 1929.

None of the above inventions and patents, taken either singly or in combination, is seen to describe the instant invention as claimed.

SUMMARY OF THE INVENTION

The invention is an improved ratchet wrench with a handle pivotally attached to a rotating head which can be locked into a position either axially aligned with the handle or laterally angled to one side of the handle. A locking mechanism includes a spring-biased, J-shaped structure, having an actuating shaft which passes through the handle and a locking pin which selectively engages one of a plurality of holes defined in a neck of the rotating head. The locking mechanism has a button on the actuating shaft to sandwich the spring against the handle and permit manual depression in order to move the locking mechanism from a locked to the unlocked position, the locking mechanism being biased by the spring towards the neck in a locked position.

Angling the handle to one side allows the wrench to be used to loosen or tighten bolts where there is insufficient space to use a conventional straight wrench. The number of different head positions is a function only of the number of holes drilled into the neck portion of the head. The button and shaft are positioned on the handle at a location where the pin can be easily depressed by an extended thumb or finger of the same hand which is turning the ratchet, thus providing convenient one-hand operation. The use of the pin, diametrically passing through the neck coaxially with the axis of the socket receiver of the ratchet head, prevents the locking mechanism from accidently unlocking under pressure when worn.

Moreover, the location of the oversized button and makes it easy to engage and disengage the rotating head while wearing gloves. Also, pressing the button requires the least amount of changes to the user's grip, especially if the button is located on the top of the handle. Thus, unlike wrenches using a spline lock, a user is not required to change his grip when depressing the button.

For working in extremely tight spaces, the handle of the wrench may be removed, allowing the ratchet head to be used as a palm wrench. The detachable head allows different size ratchet heads to be used with the same handle, preventing the necessity of purchasing additional complete tools when a different size is needed.

Accordingly, it is a principal object of the invention to provide a convenient, easy to use rotating head ratchet wrench to allow the user to reach bolts where insufficient space exists to use a conventional straight-handled wrench.

It is another object of the invention to provide a rotating head ratchet wrench whose position can be changed with only one hand.

It is a further object of the invention to provide a locking mechanism for the rotating head which will not unlock from its position once wear occurs.

Still another object of the invention is to provide a locking mechanism for the wrench which is less costly to manufacture than past locking mechanisms.

An additional object of the invention is to provide a ratchet wrench having a detachable and interchangeable head, allowing the use of the head as a palm wrench, and allowing the use of different size ratchet heads with the same handle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is a side view of an offset head ratchet wrench according to the present invention.

FIG. 4 is a top view of an offset head ratchet wrench according to the present invention.

Similar reference characters denote corresponding features consistently throughout the attached drawings.

DETAILED DESCRIPTION OF THE PREFERRED EMBODIMENT

Figure 5:
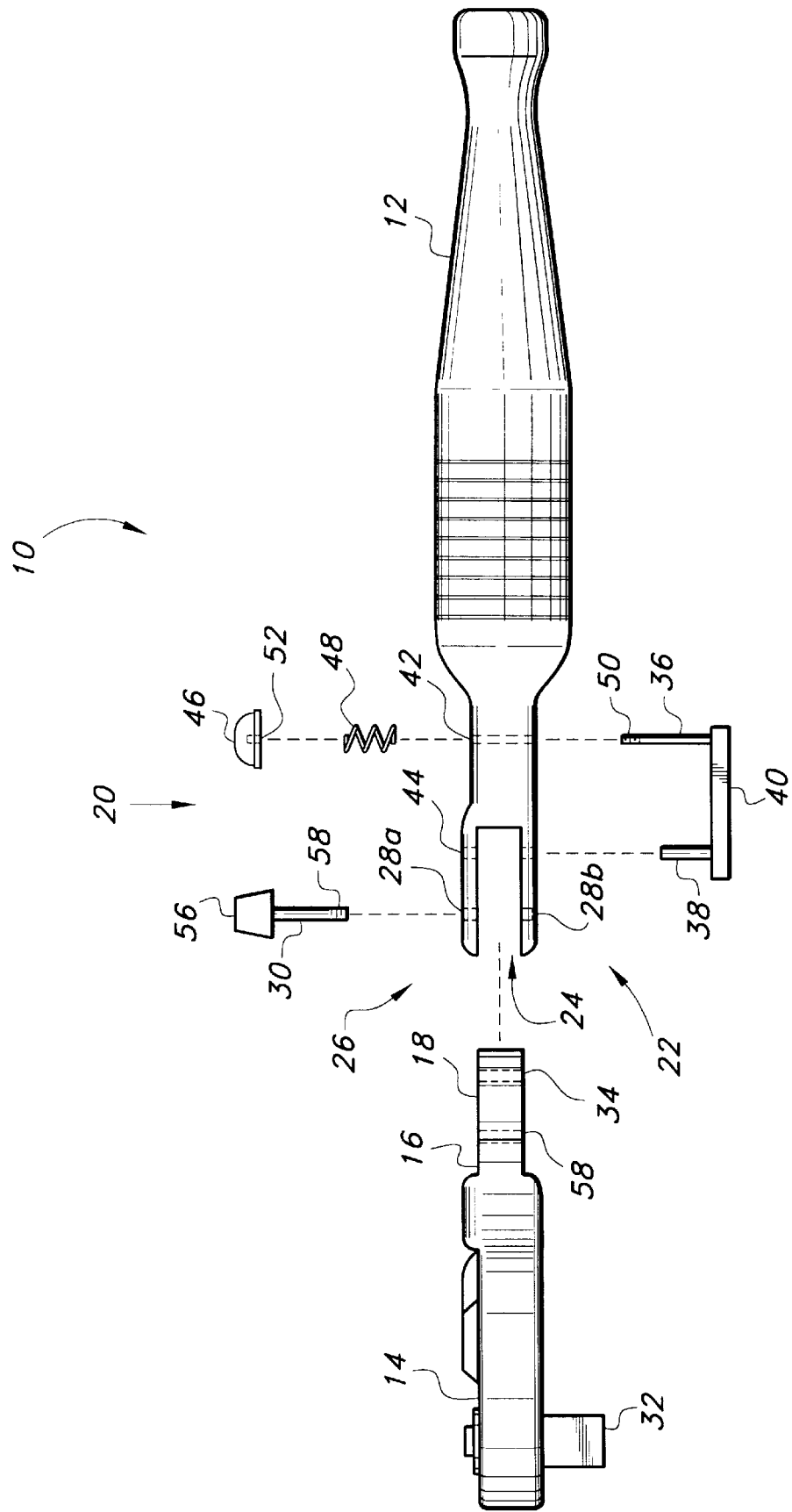
FIG. 5 is an exploded view of an offset head ratchet wrench according to the present invention.

The present invention is an improved offset head ratchet wrench 10. Referring first to FIGS. 3–5, the wrench comprises three main components: a handle 12; a ratchet head 14 having a neck 16 terminating in a flange 18 pivotally jointed to the handle 12; and a locking mechanism 20 for rigidly positioning the head 14 relative to the handle 12.

To permit rotational movement of the head 14 relative to the handle 12, the handle 12 includes a bifurcated end 22 which defines a slot 24 for receiving the flange 18. The flange 18 lies in a single plane of rotation, being connected to the handle 12 within the slot 24 by a pivot mechanism 26. The pivot mechanism 26 is a simple fork and axle arrangement, with a hole 28a, 28b defined in each fork of the bifurcated end 22 to receive the axle, illustrated as a removably attached pivot pin 30, having knob 56 at one end, and threaded end 58 opposite knob 56. Hole 28a should be smooth, while hole 28b is threaded. Pivot pin 30 therefore passes through hole 28a within one fork of bifurcated end 22, hole 58 within neck 16 of ratchet head 14, and attaches within hole 28b of the opposite fork of bifurcated end 22. The slot 24 should be positioned in a plane perpendicular to the axis passing through the ratchet head 14 and its socket receiver 32. This arrangement allows free movement of the ratchet head 14 in an arc relative the handle 12 in an operationally useful plane relative to the socket receiver 32.

The flange 18 forms a wing extending to each side of the neck 16 in the plane of the slot 24. Each wing is provided with a plurality of holes 34 serially spaced along an arc, each hole 34 equidistant from the pivot pin 30. The flange 18 extends along the neck 16 towards the head 14, providing additional material for added strength.

To fix the position of the head 14 relative to the handle 12 in any one of a plurality of desired positions, the J-shaped locking mechanism 20 engages one of the plurality of holes 34. The J-shaped locking mechanism comprises actuating shaft 36 and locking pin 38, both connected at one end to central plate 40. A preferred and suggested method of connecting the actuating shaft 36 and locking pin 38 to central plate 40 is by press-fitting the actuating shaft 36 and locking pin 38 into holes through the central plate 40. The actuating shaft 36 reciprocally passes through a first bore 42 within the handle 12, and the locking pin 38 passes through a second bore 44 in each fork of the bifurcated end 22, thus passing through the slot 24. Actuating shaft 36 includes button 46 attached to its free end, and spring 48 fits around actuating shaft 36, between handle 12 and button 46. Button 46 is preferably removably attached to actuating shaft 36 by means of threads 50 fastening to threaded hole 52 within button 46, thereby permitting the removal of button 46. The handle 12 preferably defines recesses 54, allowing central plate 40 and button 46 to be positioned closer to the handle 12.

The locking mechanism 20 reciprocates between a locked position and an unlocked position, with spring 48 biasing the locking mechanism 20 in the locked position. In the locked position, a hole 34 of the flange 18 is in registry with the bore 44 of the bifurcated end 22 so that the locking pin 38 passes through one of several holes 34 in the flange 18. In an unlocked position, the locking pin 38 is disengaged from the hole 34 and free of flange 18, and extends through only one fork of the bifurcated end 22, permitting free rotation of the head 14. The locking mechanism 20 is moved from the locked position to the unlocked position by depressing button 46.

The upward or downward orientation of the locking mechanism 20 is determined relative to the socket receiver. The locking mechanism 20 can be installed so that the button 46 is either on the top or bottom of the handle. If the button 46 is on the bottom of the handle 12 (i.e. the same side as the socket receiver 32), the index finger of the hand gripping the handle may be extended while gripping the handle 12 and engage the button 46. If the button 46 is on the top of the handle 12, the thumb of the hand gripping the handle 12 may be used to depress the button 46.

An important advantage of the present invention is that the user may reverse the position of button 46 as desired. Referring to FIG. 5, by unscrewing the button 46 from the actuating shaft 36, the button 46, spring 48, and actuating shaft 36 separate, thereby allowing the removal of locking mechanism 20. The locking mechanism 20 may then be positioned in the desired configuration, and the spring 48 and button 46 reinstalled on actuating shaft 36, thereby securing the locking mechanism 20 in place.

Although the Figures only show three to five different holes 34 and corresponding positions, the number of positions are limited only by the desired and chosen number and location of the holes drilled in the flange 18.

Figure 1:
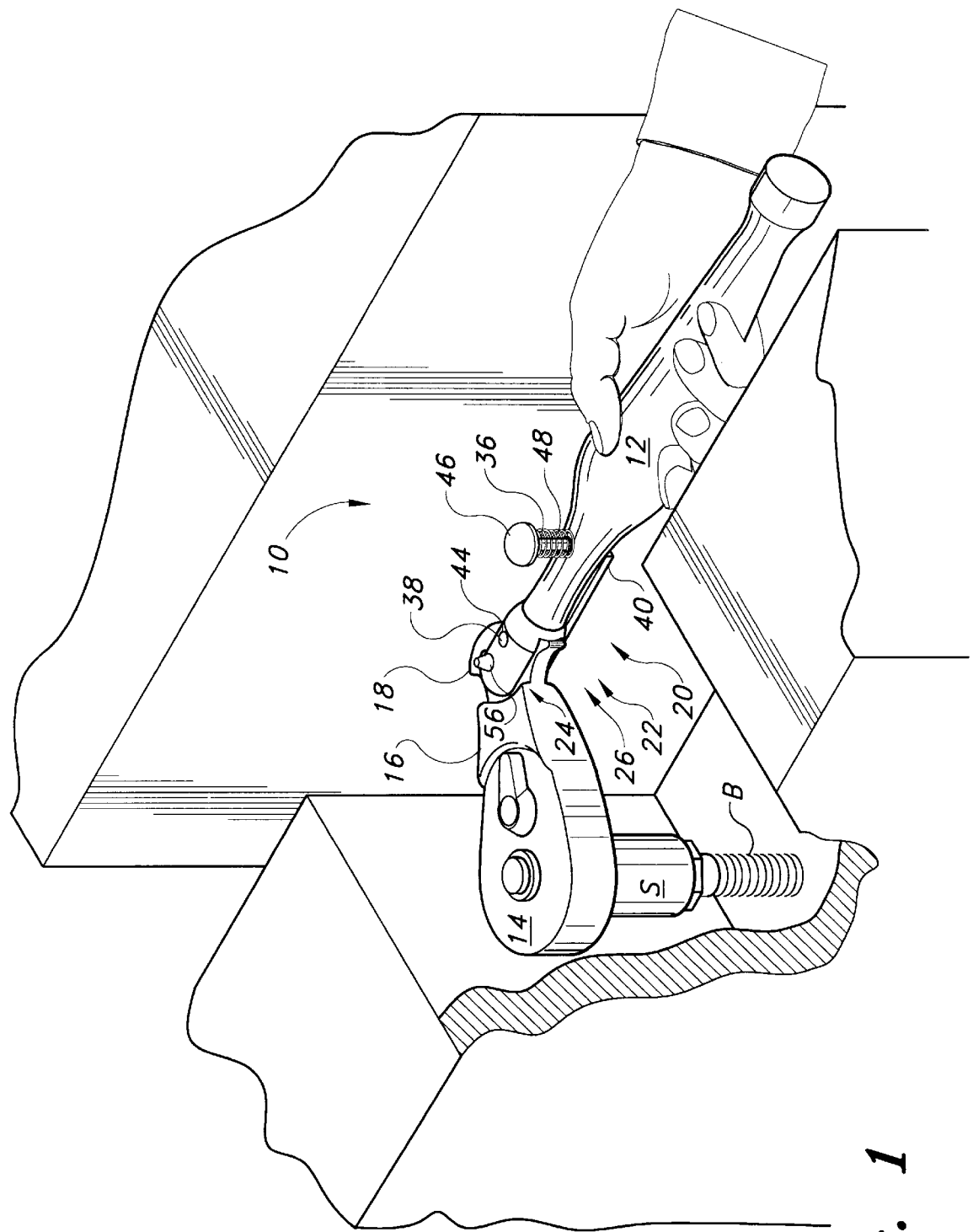
FIG. 1 is an environmental, perspective view of an offset head ratchet wrench according to the present invention, having the ratchet head rotated to one side, and being used to tighten a bolt in a hard to reach location.

FIG. 1 shows one possible use for the offset head ratchet wrench 10. In the Figure, there is insufficient room to reach the bolt B using a conventional straight-handle wrench. The rotating ratchet head 14 allows the user to position the handle 12 where there is room for it and his hand, and thereby provides a way to set the socket S onto the bolt B. Similar situations are often encountered by automobile mechanics when working on a car.

Figure 2:
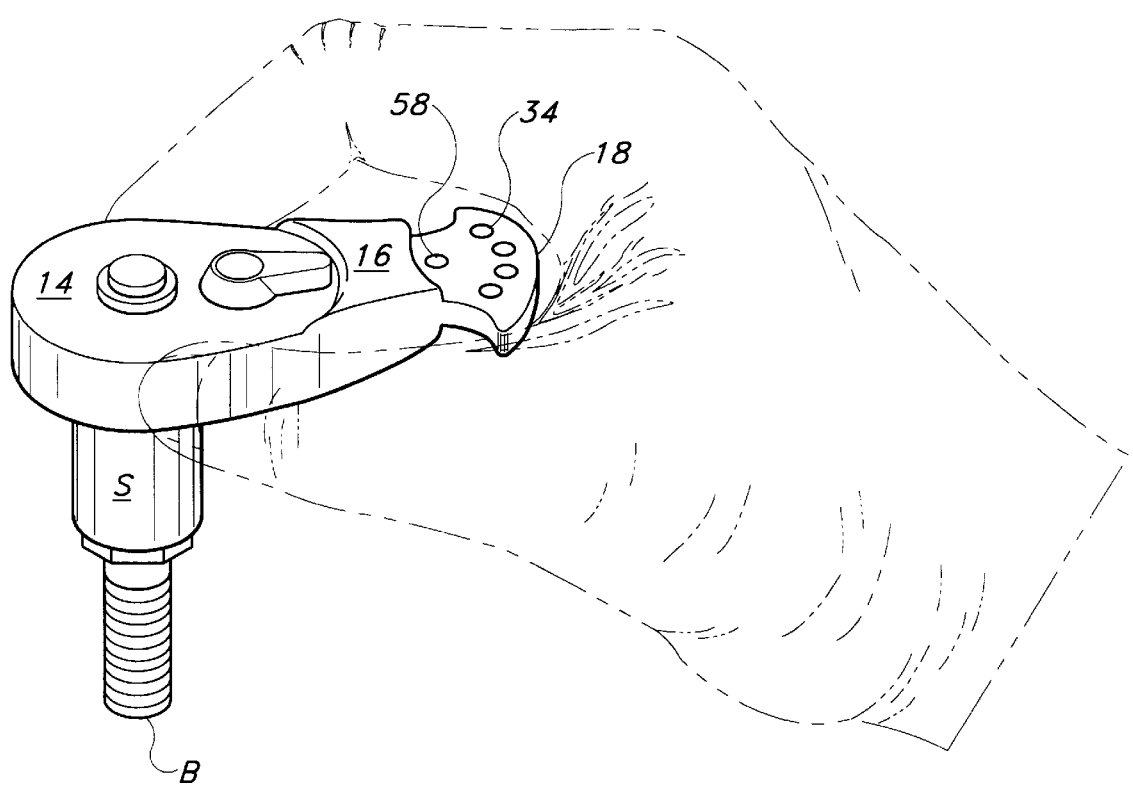
FIG. 2 is an environmental, perspective view of an offset head ratchet wrench according to the present invention, having the ratchet head removed from the handle, and being used to tighten a bolt in a hard to reach location.

FIG. 2 illustrates an alternative use of the offset head ratchet wrench 10. On occasion, the user will need to gain access to a bolt B located where any ratchet wrench having a handle will be too bulky to reach it. By using knob 56 to unscrew pivot pin 30 from hole 28b, and removing pivot pin 30, and by removing locking pin 38 from any of the holes 34, either by depressing button 46 or removing locking mechanism 20 as described above, ratchet head 14 may be detached from handle 12, so that ratchet head 14 may be used as a palm wrench. The removable ratchet head 14 has the additional advantage of allowing a ratchet head 14 with a different size ratchet 32 to be installed on handle 12. Therefore, when a different size ratchet 32 is required, it is not necessary to purchase a complete new tool.

The invention has the advantages of one hand operation, ease of manufacture, and lasting ability to lock the ratchet head in place as the locking mechanism wears. The button can be pressed with the thumb or index finger while the rest of the user's hand remains on the handle. If the pin or the holes begin to wear, the pin passing diametrically through the flange and bifurcated end prevents the pin from slipping out when pressure is applied, as can happen with many other designs of related art wrenches.

It is to be understood that the present invention is not limited to the sole embodiment described above, but encompasses any and all embodiments within the scope of the following claims.

I claim:

1. A ratchet wrench comprising:

a handle having a bifurcated end defining a slot, said handle having a top and a bottom;

a ratchet head having plane of rotation lying in substantially the same plane as said slot and a socket receiver having an axis oriented perpendicular to said plane of said ratchet head;

a neck depending from said ratchet head;

a flange terminating said neck and dimensioned and configured to be received by said slot;

a pivot means for permitting rotation of said flange through said slot, said pivot means joining said flange to said bifurcated end and defining a rotational axis;

said flange defining a plurality of holes, said holes being serially spaced along an arc and equidistant from said rotational axis; and a locking mechanism comprising:

an actuating shaft having a first end and a second end, said shaft reciprocally passing through said handle perpendicular to said plane of rotation;

a central section connected to said shaft's first end;

a locking pin having a first end and a second end, said locking pin's first end being connected to said central section, said locking pin passing through said bifurcated end, said locking pin engaging one of said plurality of holes in a locked position and, when said shaft is reciprocally moved, said locking pin disengaging said hole to define an unlocked position thereby permitting said head to freely rotate;

a button attached to said actuating shaft's second end; and a spring sandwiched between said button and said handle, said spring biasing said locking mechanism towards said locked position.

2. The ratchet wrench according to claim 1, wherein said shaft, central section, and locking pin form a J-shaped structure.

3. The ratchet wrench according to claim 2, wherein:

said central section comprises a plate having a pair of parallel holes; and said shaft's first end and said locking pin's first end are secured within said central section's parallel holes.

4. The ratchet wrench according to claim 2, wherein said button is removably attached to said actuating shaft.

5. The ratchet wrench according to claim 2, wherein said button's position is reversible between said handle's top and said handle's bottom.

6. The ratchet wrench according to claim 1, wherein said handle defines at least one recess adjacent to said locking mechanism.

7. The ratchet wrench according to claim 1, wherein said pivot means is a removably attached pin.

8. The ratchet wrench according to claim 7, wherein said removably attached pin comprises a first end and a second end, with said first end having a knob, and said second end being threaded, said second end being dimensioned and configured to mate with said bifurcated end.

9. The ratchet wrench according to claim 1, wherein said ratchet head is removably attached to said handle.

* * * * *